(No Model.)
D. B. WOOSTER.
CHURN.
No. 282,143. Patented July 31, 1883.
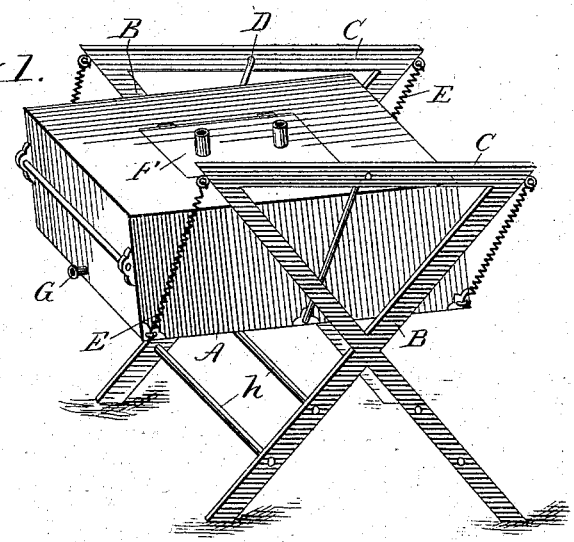
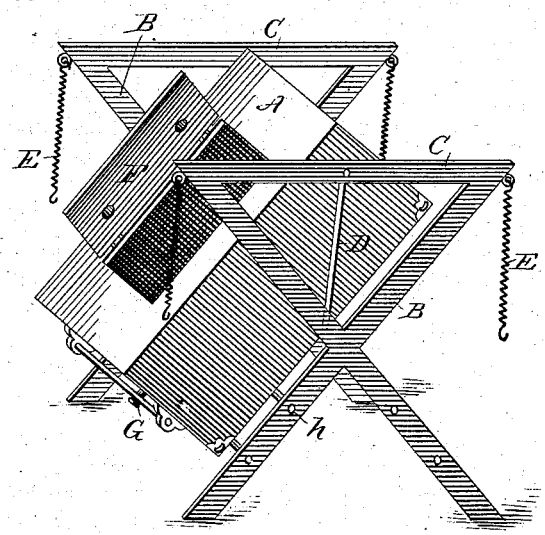
Witnesses.
E. M. Wooster.
E. J. Moore.
Inventor.
Daniel B. Wooster

UNITED STATES PATENT OFFICE.

DANIEL B. WOOSTER, OF NORTHFIELD, VERMONT.

CHURN.

SPECIFICATION forming part of Letters Patent No. 282,143, dated July 31, 1883.

Application filed February 23, 1883. (No model.)

*To all whom it may concern:*

Be it known that I, DANIEL B. WOOSTER, of Northfield, in the county of Washington and State of Vermont, have invented a new and useful Churn for Converting Cream into Butter.

Said invention is fully set forth in the following specification, reference being had to the accompanying drawings.

The object of this invention is to provide a churn, cheaply constructed and easily operated, whereby the cream can be converted into butter without injuring the grain or texture.

In order to accomplish the said object, advantage is taken of the natural laws governing mechanical movements. A common method of churning is to use a dash or paddles, or to oscillate in a horizontal manner, producing only one motion of the cream with a single stroke of the dash, paddles, or churn. The churn designed to carry out this principle can now be readily understood by reference to the accompanying drawings, forming part of this specification, in which—

Figure 1 is a view in perspective. Fig. 2 is a view of the churn when in position for removing the butter.

In Fig. 1, A is a box for containing cream. B is a frame. C is a horizontal bar uniting the top of the frame B on both sides. D D are rods, preferably of metal, secured at the center of the bars C C and churn A in any convenient manner. E E E E are yielding supports or coiled springs secured to the upper end of the frame B and to both ends of the churn A. F is a ventilated cover to the churn A. G is a discharge-outlet to the churn, and stopper in said outlet. *h h h h* are cross-rods that secure the frame of the churn in an upright and firm position.

When it is desired to remove the butter, the cover F is removed and yielding supports E E are unfastened at one end of the churn, as may be desired, allowing the churn to assume a position more or less perpendicular, one end of the churn resting on either of the cross-rods *h*.

I have shown my invention, in Fig. 1, as consisting of an oblong box and cross-bar frame; but the frame and box may be of any shape, and therefore I would have it understood that I do not limit myself to any particular shape of apparatus.

Having thus described my invention, what I claim, and desire to secure by Letters Patent, is—

In combination with the churn A, provided with bail D, the supporting-frame B, consisting of cross-rods *h*, and horizontal bars C, having center and end bearings for said bail, and the yielding supports E, all substantially as described.

In testimony whereof I have signed this specification in the presence of two subscribing witnesses.

DANIEL B. WOOSTER.

Witnesses:
   E. J. MOORE,
   E. M. WOOSTER.